US007025263B2

(12) United States Patent
Kocott

(10) Patent No.: US 7,025,263 B2
(45) Date of Patent: Apr. 11, 2006

(54) SYSTEMS AND METHODS FOR TRACKING ALCOHOLIC CONTAINERS

(76) Inventor: Joseph M. Kocott, 2344 School St., Pittsburgh, PA (US) 15235

( * ) Notice: Subject to any disclaimer, the term of this patent is extended or adjusted under 35 U.S.C. 154(b) by 0 days.

(21) Appl. No.: 10/939,027

(22) Filed: Sep. 10, 2004

(65) Prior Publication Data

US 2005/0051625 A1 Mar. 10, 2005

Related U.S. Application Data

(60) Provisional application No. 60/501,775, filed on Sep. 10, 2003.

(51) Int. Cl.
*G06F 17/60* (2006.01)
*G06F 17/00* (2006.01)

(52) U.S. Cl. .......................... 235/385; 235/375; 705/28

(58) Field of Classification Search ................ 235/375, 235/385, 487; 705/28, 14
See application file for complete search history.

(56) References Cited

U.S. PATENT DOCUMENTS

| 6,282,516 | B1 * | 8/2001 | Giuliani ........................ 705/14 |
| 6,450,406 | B1 * | 9/2002 | Brown ................... 235/462.45 |
| 6,746,053 | B1 * | 6/2004 | Afzali-Ardakani et al. ... 283/72 |
| 6,810,816 | B1 * | 11/2004 | Rennard ...................... 102/430 |
| 6,851,615 | B1 * | 2/2005 | Jones .......................... 235/487 |
| 2002/0178959 | A1 * | 12/2002 | Rennard ...................... 102/430 |
| 2003/0034392 | A1 * | 2/2003 | Grimm et al. .............. 235/385 |

* cited by examiner

*Primary Examiner*—Karl D. Frech
*Assistant Examiner*—April Taylor
(74) *Attorney, Agent, or Firm*—Blynn L. Shideler; Krisanne Shideler; BLK Law Group

(57) ABSTRACT

Systems and methods for systematically tracking alcoholic containers throughout a given area (e.g., country, state, county, or municipality) to ascertain the transferee or purchaser of an alcoholic container at any given time in the history of the transfer or purchase of the alcoholic container.

20 Claims, 6 Drawing Sheets

SYSTEMS AND METHODS FOR TRACKING ALCOHOLIC CONTAINERS

RELATED APPLICATIONS

This application claims the priority to U.S. Provisional Patent Application Ser. No. 60/501775, which was filed on Sep. 10, 2003 and which is incorporated herein by reference it its entirety.

TECHNICAL FIELD

The present invention relates generally to systems and methods for tracking products. More particularly, the present invention relates to systems and methods for tracking alcoholic containers from the point of manufacture, through distribution, to a point of detection to enable verification of the purchaser or transferee of a specific alcoholic container.

BACKGROUND

Tracking systems traditionally have been used to provide benefits to sellers as well as consumers. For instance, one example of a tracking system described in U.S. Pat. No. 6,409,082 to Davis et al. prevents products from being sold by unauthorized distributors. Another example of a tracking system described in U.S. Pat. No. 5,478,990 to Montanari et al. allows consumers to verify the organic status of a food product and/or to identify the source of contamination.

In the alcoholic beverage industry and society in general, however, there is a lack of any satisfactory method for tracking alcoholic containers. Once alcohol is purchased, the purchaser can, without much apprehension, give or sell the alcohol to underage persons. Additionally, if underage persons are found to have been drinking alcohol, there usually is no way to conclusively determine the purchaser of the alcohol. The underage persons are usually reluctant to divulge the name of the person who gave or sold them the alcohol, and if they do divulge a name, that person usually denies the same, putting the law enforcement personnel in the position to determine who is telling the truth.

The consequences stemming from the unmonitored and abusive consumption of alcohol by those not of legal age has long been a societal issue of the utmost concern. Every year thousands of families are destroyed as a result of the underage consumption of alcohol. In general, statistics regarding the effects of alcoholic consumption on persons of any age staggering. However, the effects are even more striking in teens. Alcohol remains the most prevalent drug problem of today's youth. Many of us are familiar with a tragic consequence stemming from underage drinking. Moreover, the combination of alcohol use and driving by underage persons with little driving experience and low alcohol tolerance can be deadly. But several other problems are associated with underage drinking, including crime, various types of traumatic injury, suicide, fetal alcohol syndrome, alcohol poisonings, alcohol dependence and abuse requiring treatment.

Accordingly, there is a need for systems and methods for tracking alcoholic containers in a way that attempts to inhibit the consumption of alcohol by minors and acts as a deterrent to underage drinking.

SUMMARY

In general, alcoholic containers are tracked from the point of manufacture, through distribution, to a point of detection. Because the system is capable of identifying and verifying the purchaser and/or transferee of the alcoholic container, accountability is created for each purchaser and/or transferee of the alcoholic container so that the purchaser or transferee will be less inclined to give or sell the alcohol to underage persons.

In one embodiment, individual alcoholic containers are permanently affixed with a unique identity code. Whenever and wherever alcohol is transferred, each individual alcoholic container will be scanned by a scanning system and associated with identification information for the transferee or purchaser. The identification information will also be scanned by a scanning system. At each point of transfer or purchase, the associated information is transmitted via a network to a centralized host system, where it is stored. This stored series of associated information comprises an alcohol container tracking data record.

In some implementations, when an alcoholic container is scanned at a point of detection, authorized personnel can then access the alcohol container tracking data record. The alcohol container tracking data record will indicate the transferee or purchaser of the alcoholic container at each point of transfer or purchase, as well as the place, date and time of the transfer or purchase. This information will be relative to each identity code. This enables one to ascertain the transferee or purchaser of an alcoholic container at any interval through its progression from manufacture to detection.

DETAILED DESCRIPTION

In one general aspect, the present invention provides a method of identification that allows a random alcoholic container's identity to be ascertained. The present invention thus makes it possible to track an individual alcohol container, thereby creating the ability to determine responsibility for the container.

Figure 1:
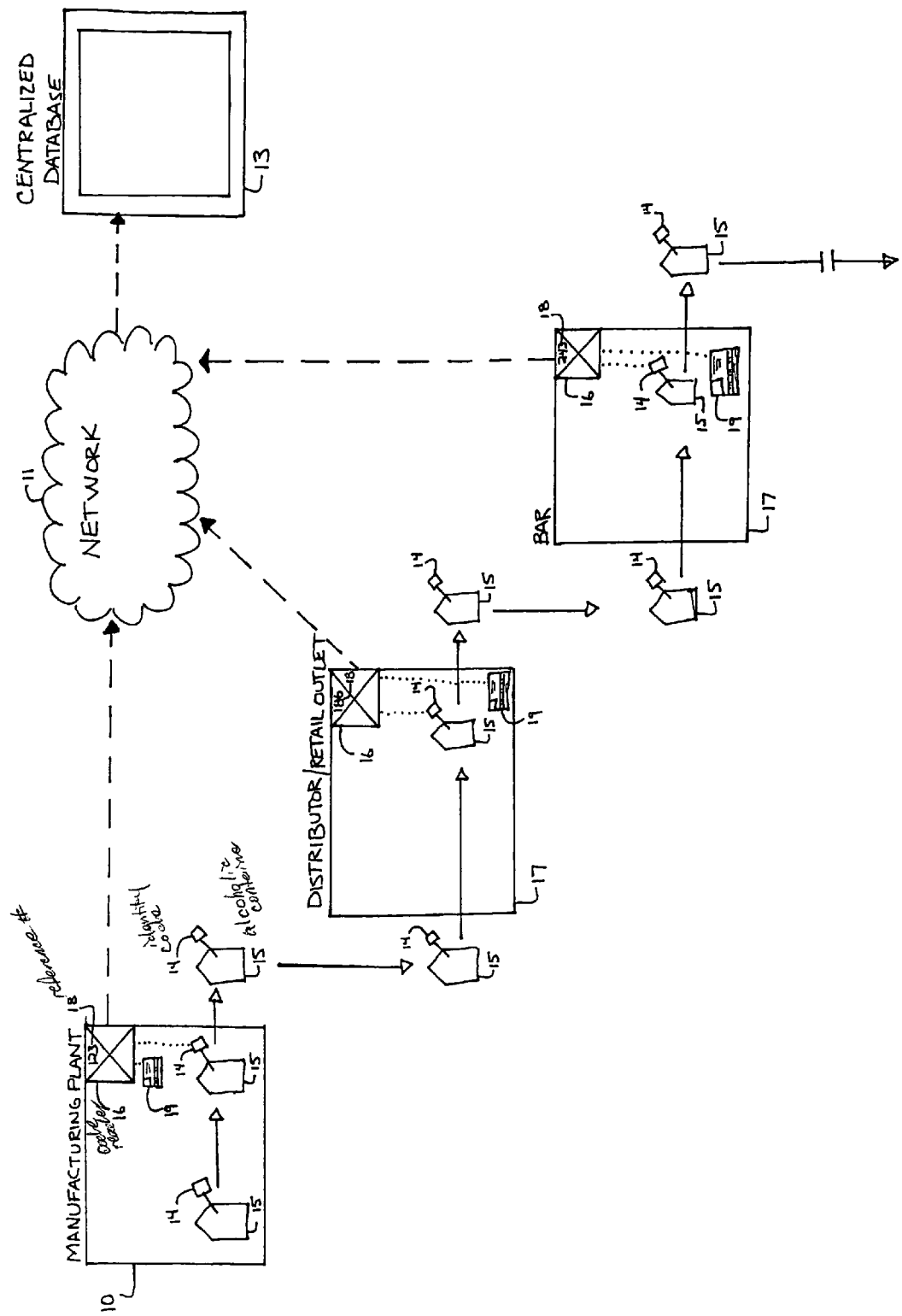
FIG. 1 illustrates a block diagram of one embodiment of a tracking system.

FIG. 1 illustrates one embodiment of a tracking system. It is to be understood that some elements of the tracking system may include numerous interconnected computers and components designed to perform a set of specified operations.

In this embodiment, the tracking system is configured to track the progression of an alcoholic container 15 from a point of manufacture 10 to a point of storage. An alcoholic container may be any item that includes a beverage with alcoholic content such as, for example, a can, bottle, pack, case, etc.

In one implementation, identity of each alcoholic container 15 is determined by means of an identity code 14. For example, each individual alcoholic container 15 may have a unique identity code 14 that is permanently affixed to the alcoholic container 15 at a point of manufacture 10, for example. The identity code 14 may contain a series of identifying numbers, letters, symbols, and/or combination thereof. In some embodiments, the identity code 14 may be implemented by a bar code or a radio frequency identifier (RFID), such as, for example, a radio frequency tag.

In one implementation, the identity code 14 is capable of being deciphered by an identity code reader 16 located at every point of transfer or sale 17. Each identity code reader 16, in turn, may be given a reference number 18 corresponding to a unique number that identifies the particular distributor or retail outlet, i.e. a point of transfer or sale 17.

At each point or stage, information affixed on each container 15 is associated with identification information from the purchaser or transferee of the container. This associated information is then transmitted via a network 11 and stored in a centralized database 13.

Figure 2:
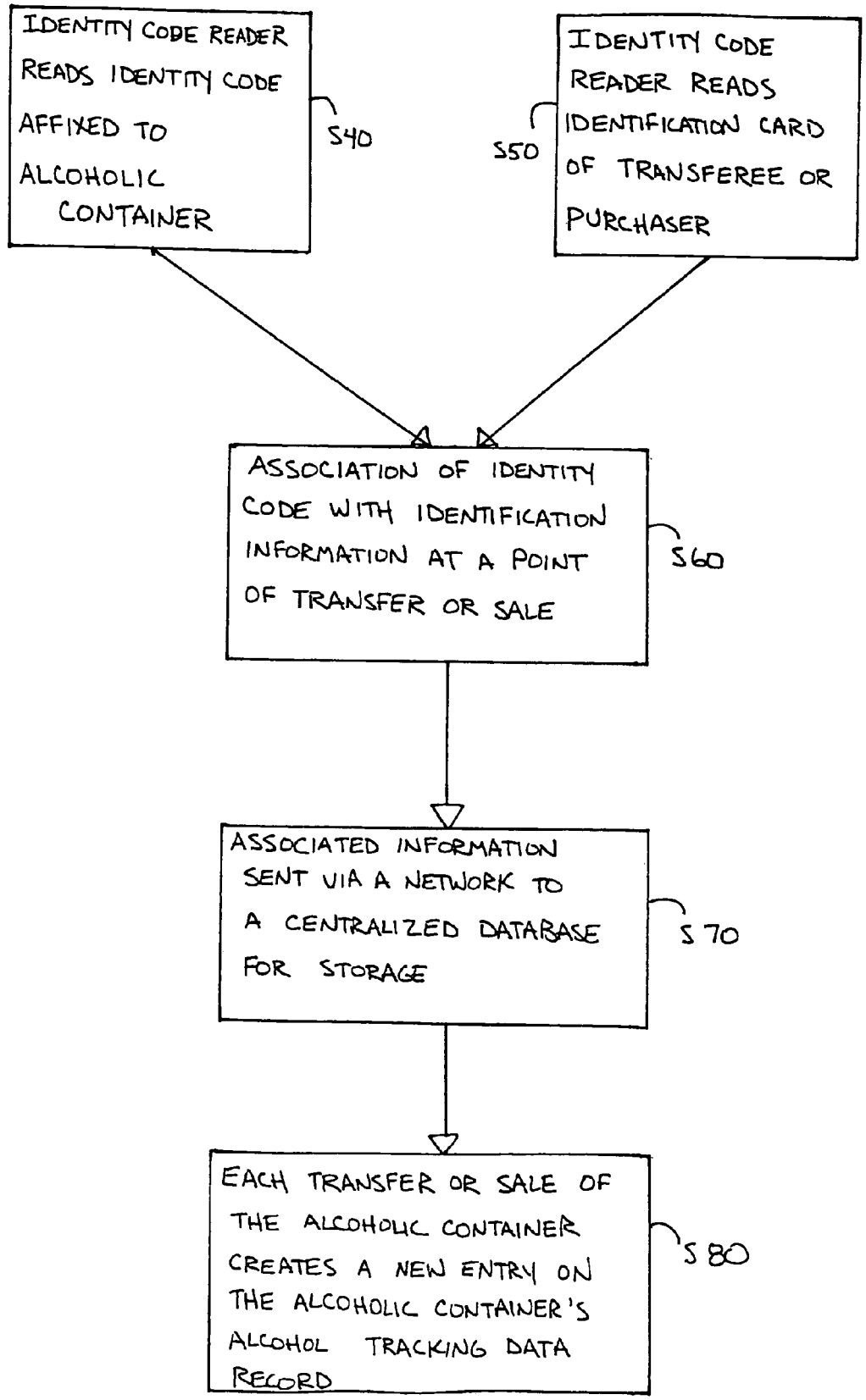
FIG. 2 is a flow chart illustrating one embodiment of a method for associating an alcoholic container with a transferee and/or purchaser.

FIG. 2 is a flow chart illustrating a series of steps that may be performed at a point of transfer or sale for associating the alcoholic container with the transferee or purchaser. It is to be understood that aspects of this method, in some cases, may be implemented by hardware (e.g., device, computer, computer system, equipment, component), software (e.g., program, application, instructions, code), a storage medium (e.g., disk, external memory, internal memory, propagated signal), or combination thereof.

Before an alcoholic container 15 is transferred from each point 10, 17, the identity code reader 16 reads each identity code affixed 14 to each alcoholic container (S40). Additionally, the identity code reader 16 reads an identification card 19 produced by the transferee or purchaser of the alcoholic container 15 (S50). Selected information from the identification card is associated and correlated with the identity code 14 at the point of transfer or sale 17 (S60). The selected identification information from the identification card may include the purchaser's birth date, address and/or license number. In one embodiment, at least one of the identity code 14 and the identification information may be implemented by a radio frequency identifier (RFID), such as, for example, a radio frequency tag.

The associated information, the reference number and the date and time of the sale 81, is then transmitted 12 via a network 11 to a centralized database 13 for storage (S70). Ostensibly, each transfer or sale of the alcoholic container 15 will create a new compilation of information, i.e. the associated information coupled the reference number and date and time of the transaction (S80). Thus each sale or transfer will create a new entry in the storage database 82, with the new entry being categorized with the other transfers respective to the identity code.

Figure 3:
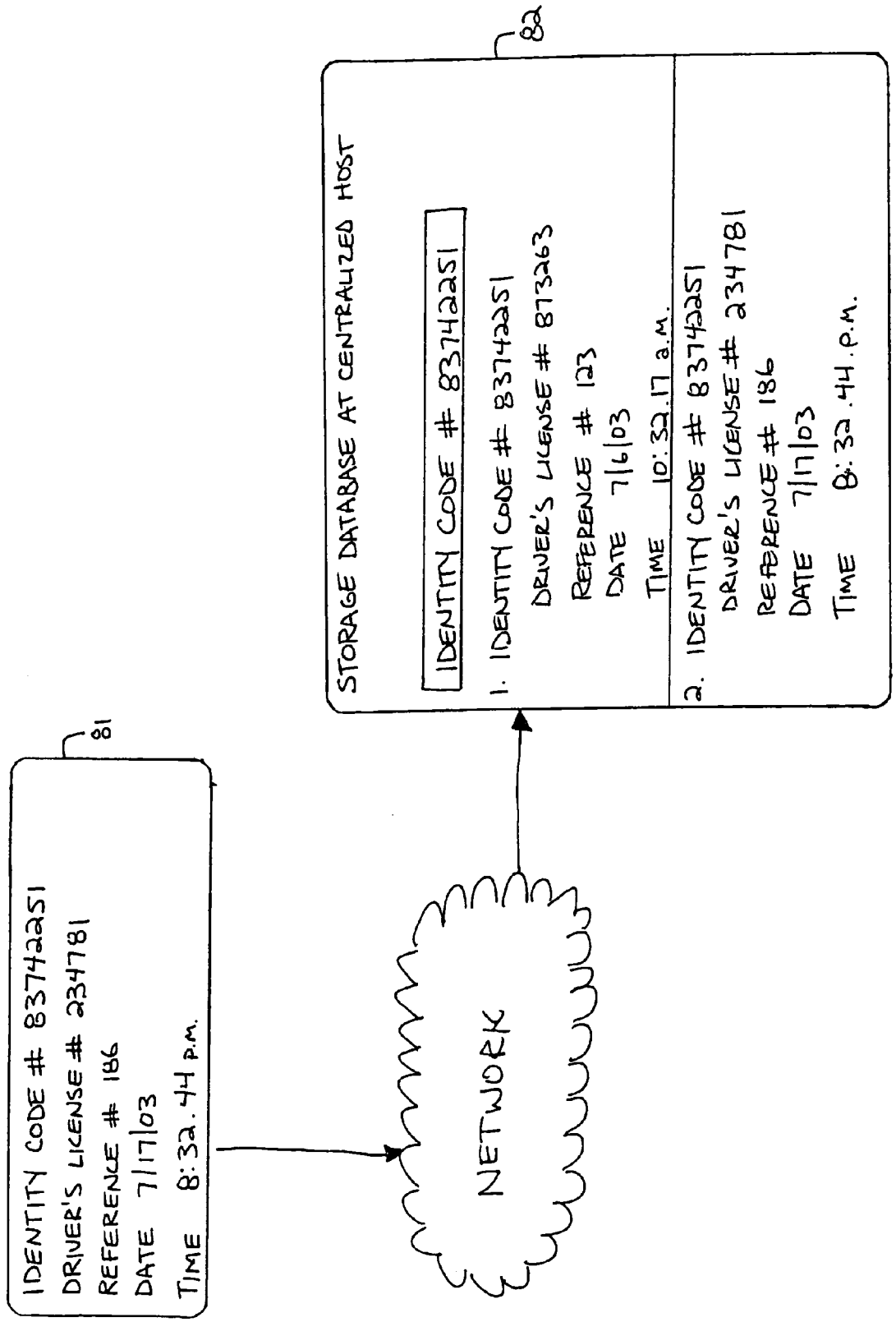
FIG. 3 illustrates one embodiment of an entry into an alcohol container tracking data record.

FIG. 3 illustrates an example of an entry 81 to the storage database 82. As described above, whenever and wherever alcohol is transferred, either from manufacturer to distributor, distributor to distributor, distributor to retail outlet, distributor to purchaser, or retail outlet to a purchaser, each alcoholic container will be scanned by a scanning system and associated with identification information for the transferee or purchaser. The identification will also be scanned by the scanning system. At each point of transfer or purchase, the associated information is transmitted via a network to a centralized host system, where it is stored.

Figure 4:
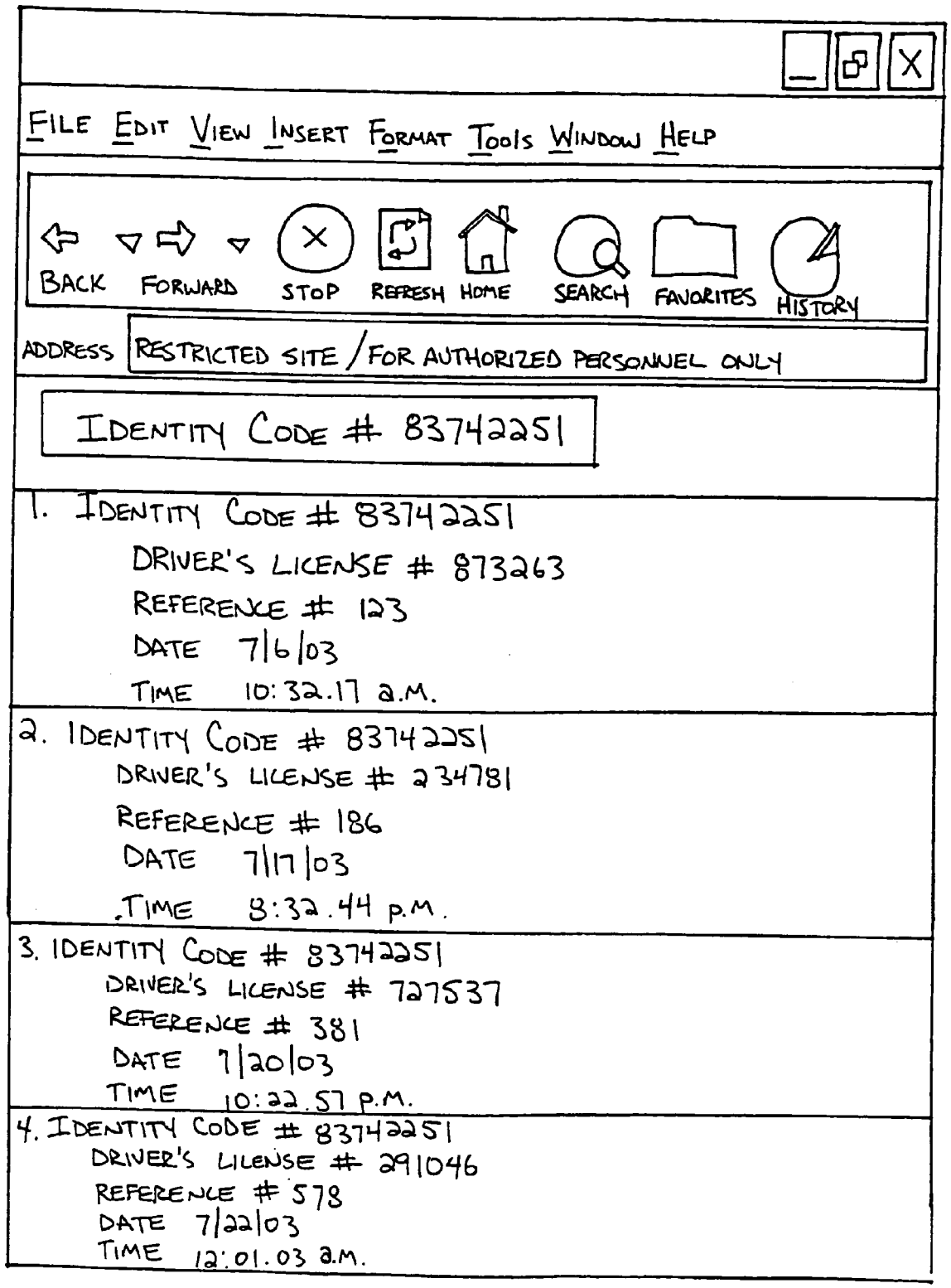
FIG. 4 illustrates one embodiment of an alcohol container tracking data record.

This series of associated information comprises an alcohol container tracking data record. The associated identification information gathered by the identity code reader can be represented as an alcohol container tracking data record, such as that represented graphically in FIG. 4.

Figure 5:
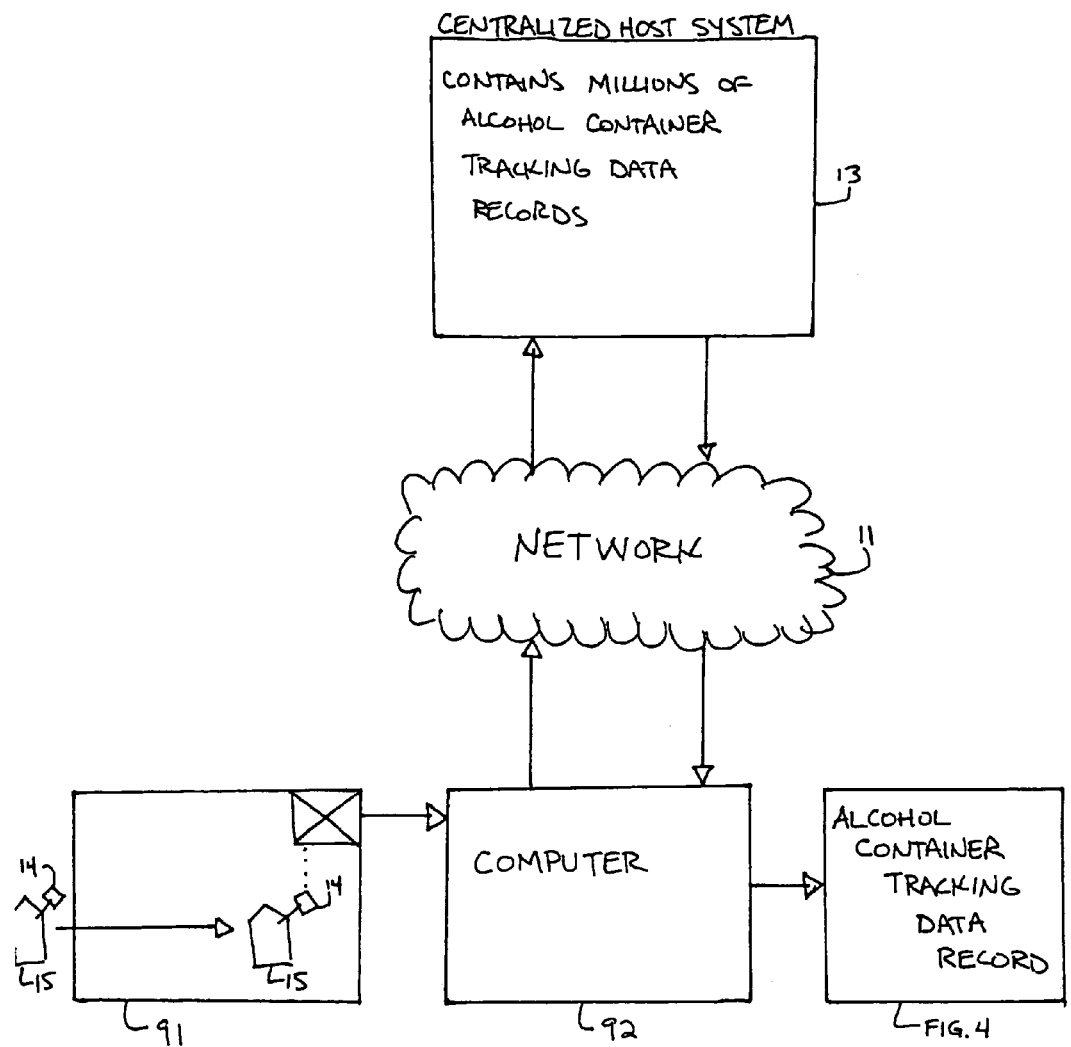
FIG. 5 illustrates a block diagram of one embodiment of a tracking system.

FIG. 5 illustrates a block diagram of one embodiment of a tracking system from the point of storage 13 to a point of detection 91. It is to be understood that some elements of the tracking system may include numerous interconnected computers and components designed to perform a set of specified operations.

In this embodiment, the centralized host system 13 typically will contain numerous alcohol container tracking data records categorized and/or identified by their identity code 14. When an alcoholic container is scanned at a point of detection 91, the alcohol container tracking data record (see FIG. 4) can be accessed. The alcohol container tracking data record will indicate the transferee or purchaser of the alcoholic container at each point of transfer or purchase, as well as the place, date and time of the transfer or purchase.

Figure 6:
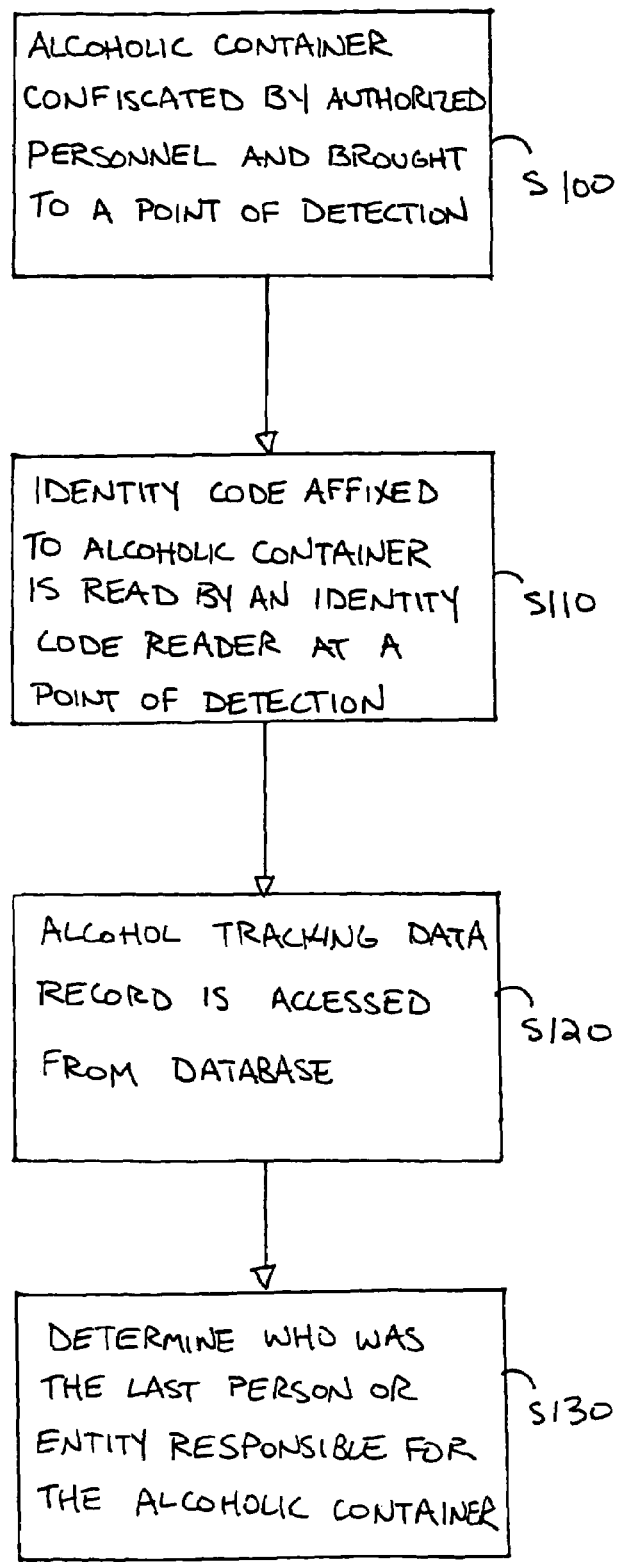
FIG. 6 is a flow chart illustrating one embodiment of a method for retrieving an alcohol container tracking data record.

FIG. 6 is a flow chart illustrating a series of steps that may be performed at a point of detection 91 for retrieving an alcohol container tracking data record. It is to be understood that aspects of this method, in some cases, may be implemented by hardware (e.g., device, computer, computer system, equipment, component), software (e.g., program, application, instructions, code), a storage medium (e.g., disk, external memory, internal memory, propagated signal), or combination thereof.

At a time when the purchaser or transferee of an alcoholic container 15 must be determined, the alcoholic container 15 is brought to a point of detection 91 by authorized personnel (S100). The identity code 14 affixed to the alcoholic container 15 is then read by an identity code reader 16 at the point of detection 91 (S110). Once the alcoholic container 15 is read by the identity code reader 16 (S110) the alcohol tracking data record is accessed from the centralized database 13 by means of a network 11 (S120). Authorized personnel can then determine the last person or entity responsible for the alcoholic container, as well as verify the date, time and place the container was purchased (S130).

Aspects of the present invention may be implemented by a computer system and/or by a computer program stored on a computer readable medium. The computer readable medium may be a disk, a device, and/or a propagated signal.

The computer system may include a client system connected through a network to a destination system. The client system may include hardware and/or software components for communicating with the network and destination system. The destination system may include and/or form part of an information delivery network, such as, for example the Internet, the World Wide Web, an online service provider, and/or any other analog or digital wired and/or wireless network that provides information. The client system and destination system each may include one or more devices operating under the command of one or more programs.

Examples of a device include, but are not limited to, a personal computer ("PC"), a workstation, a server, a laptop, a Web-enabled telephone, a Web-enabled personal digital assistant ("PDA"), or any other component, machine, tool, equipment, or some combination thereof capable of responding to and executing instructions.

Examples of a program include, but are not limited to, a software application, a piece of code, an instruction, another device, or some combination thereof, for independently or collectively instructing the device to interact and operate as desired. The program may be embodied permanently or temporarily in any type of machine, component, physical or virtual equipment, storage medium, or propagated signal capable of providing instructions to a device. In particular, the program may be stored on a storage media or device readable by a computer, such that if the storage media or device is read by a computer system, the functions described herein are performed.

Examples of a network include, but are not limited to, a local area network ("LAN"), a wide area network ("WAN"), the Internet, the Web, a telephone network, a radio network, a television network, a cable network, a satellite network, and/or any other wired or wireless communications network configured to carry data. The network may include one or more elements, such as, for example, intermediate nodes, proxy servers, routers, switches, adapters, and wired or wireless data pathways, configured to direct and/or deliver data.

What is claimed is:

1. A system for tracking alcoholic beverage containers, the system comprising:
   a unique identity code affixed to a container including an alcoholic beverage, the unique identity code including a radio frequency identifier;
   an identification terminal configured to read identification information embedded within an identification card;
   an identity code reader configured to read an unique identity code affixed to a container including an alcoholic beverage
   a centralized host system configured to store an integrated listing of alcoholic beverage containers and identification information from the identification cards of transferees of each alcoholic beverage container; and
   a communicating device configured to combine the identification information and unique identity code information and communicate the combined identification information and the unique identity code information to the centralized host system for registering the transfer of the container including an alcoholic beverage.

2. The system for tracking alcoholic beverage containers of claim 1, wherein the container including an alcoholic beverage comprises alcohol sold for take out.

3. The system for tracking alcoholic beverage containers of claim 1, wherein the container including an alcoholic beverage comprises a plurality of individual bottles.

4. The system for tracking alcoholic beverage containers of claim 1, wherein the container including an alcoholic beverage comprises a plurality of individual cans.

5. The system for tracking alcoholic beverage containers of claim 1, wherein the container including an alcoholic beverage comprises one or more cases.

6. The system for tracking alcoholic beverage containers of claim 1, wherein the container including an alcoholic beverage is affixed with the unique identity code.

7. The system for tracking alcoholic beverage containers of claim 1, wherein the identification terminal comprises a credit card scanner.

8. The system for tracking alcoholic beverage containers of claim 1, wherein the identification terminal comprises a cash register.

9. The system for tracking alcoholic beverage containers of claim 1, wherein the identification terminal comprises a scanning device configured to read governmental identification cards.

10. The system for tracking alcoholic beverage containers of claim 1, wherein the identity code reader is configured to read the unique identity code that is permanently affixed to the container including an alcoholic beverage at the point of manufacture.

11. A method of tracking alcoholic beverage containers, the method comprising the steps of:
    applying a unique identity code which includes a radio frequency identifier to a container including an alcoholic beverage;
    reading the unique identity code of the radio frequency identifier at a point of transfer of an ownership of the alcoholic beverage container;
    reading identification information at the point of transfer of an ownership of the alcoholic beverage container, the identification information being embedded within an identification card;
    associating the unique identity code with the identification information at the point of transfer of an ownership of the alcoholic beverage container;
    communicating associated information over a network to a centralized host system; and
    storing the associated information in the centralized host system.

12. The method of tracking alcoholic beverage containers of claim 11, wherein an identification terminal reads identification information about a transferee.

13. The method of tracking alcoholic beverage containers of claim 12, wherein the identification information includes a Liquor Licensing Board number.

14. The method of tracking alcoholic beverage containers of claim 12, wherein the identification information is read from a government-issued identification card of a transferee.

15. The method of tracking alcoholic beverage containers of claim 14, wherein the identification information comprises a date of birth.

16. The method of tracking alcoholic beverage containers of claim 14, wherein the identification card comprises a driver's license.

17. The method of tracking alcoholic beverage containers of claim 11, wherein the unique identity code comprises one or more of: product number, case number, and individual container number.

18. The method of tracking alcoholic beverage containers of claim 11, wherein the step of communicating comprises wirelessly transmitting data across the network.

19. The method of tracking alcoholic beverage containers of claim 11, wherein the network comprises one or more of: a wireless network, a wide area network, and a local area network.

20. A system for tracking alcoholic containers, the system comprising:
    a centralized host system configured to receive identification information and identity code information, the identification information being embedded within an identification card and the identity code information being read from a radio frequency identifier that is affixed to a container including an alcoholic beverage at a time of transfer; and
    means for storing the identification information and the identity code information in the centralized host system for registering the transfer of the container of the alcoholic beverage.

* * * * *